United States Patent [19]

Legrand

[11] 4,342,154
[45] Aug. 3, 1982

[54] MEASURING BRIDGE

[75] Inventor: Pierre Legrand, Soumagne, Belgium

[73] Assignee: Applied Power Inc., Milwaukee, Wis.

[21] Appl. No.: 145,322

[22] Filed: Apr. 29, 1980

[30] Foreign Application Priority Data

Jun. 5, 1979 [DE] Fed. Rep. of Germany ....... 2922804

[51] Int. Cl.³ .............................................. G01B 5/14
[52] U.S. Cl. ............................. 33/180 AT; 33/174 G; 33/288
[58] Field of Search ........... 33/180 AT, 181 AT, 288, 33/174 A, 174 G

[56] References Cited

U.S. PATENT DOCUMENTS

| | | | |
|---|---|---|---|
| 2,053,810 | 9/1936 | Bisel | 33/174 A |
| 3,869,804 | 3/1975 | Friend | 33/288 |
| 4,165,567 | 8/1979 | Olsson | 33/288 |
| 4,207,681 | 6/1980 | Bayorgeon et al. | 33/180 AT |

Primary Examiner—William D. Martin, Jr.
Attorney, Agent, or Firm—Fred Wiviott

[57] ABSTRACT

A measuring bridge for determining the orientation of reference points on a motor vehicle including a single bending resistant measuring bar and a plurality of measuring vehicles mounted respectively on first and second tracks disposed on the opposite sides of the measuring bar and extending longitudinally therealong. Each measuring vehicle is movable longitudinally along the tracks independently of the other vehicles and each extends normally therefrom so that their outer ends are spaced from the tracks. Additional tracks are formed on each vehicle and extend perpendicularly to the measuring bar for supporting measuring devices for lateral movement relative to the bar. Supporting means extend downwardly from at least a pair of vehicles on each side of the measuring bar so that the bridge may be oriented relative to the motor vehicle.

23 Claims, 7 Drawing Figures

MEASURING BRIDGE

The invention concerns a measuring bridge for determining the orientation of reference points on the body or frame of motor vehicles, having at least one essentially vertical and longitudinally variable measuring adaptor which, being attached to at least one measuring vehicle, is adjustable and selectively determinable in the longitudinal direction of a vehicle to be measured, and which is adjustable and selectively determinable transversely to such vehicle.

Measuring bridges of this type, which in particular can serve, in conjunction with a straightening device for the straightening of damaged motor vehicles, to determine the extent of distortions of body and frame, as well as to continually trace and measure the repair of such distortions during straightening, are described U.S. Pat. Nos. 4,055,061 and 4,174,623. These known measuring bridges consist mainly of a rectangular frame with three spans, such spans being connected with each other by means of several crossbars; the lateral span surfaces facing each other are equipped with guides, along which the measuring vehicles can be adjusted in the longitudinal direction of the frame. These measuring vehicles run transversely to, and between, the spans, and they have upper portions which can be adjusted transversely to the spans and are in turn the supports for vertical running measuring adaptors. When working with these known measuring bridges, the frames are placed below, and parallel to the longitudinal direction of, a motor vehicle to be measured, and the measuring adaptors are adjustable in conjunction with the respective measuring vehicles in the longitudinal direction of the motor vehicle, and in conjunction with the upper portions of the measuring vehicle they are adjustable in a transverse direction. In addition, the measuring adaptors themselves are adjustable in their length; thus they can follow any position changes during the straightening operation having a reference point on the motor vehicle with which (reference point) the respective measuring adaptor is connected at its free end.

These known measuring bridges constitute a good aid in measuring motor vehicles, in particular as a basis for following or simultaneous repair of accident damages; however, in practical application they leave a few things to be desired. Their frames, for example, are relatively heavy and unwieldy structures, which result in large requirements of space and power for storage, transportation and handling. Furthermore, these frames prevent free access to certain parts of a vehicle which is to be straightened simultaneously with, or after, the measuring; likewise, they can complicate considerably the attaching of the motor vehicle to the support of the straightening device by making impossible, for example, the use of some anchoring and clamping devices. Also, it is frequently inconvenient that the measuring vehicles are permanently attached to the guides between the spans of the frames and cannot be removed from them; finally, the exact alignment of the relatively bulky frames with the vehicle to be measured often turns out to be difficult.

The object of the invention is the design of a measuring bridge of the above-mentioned type so that the bridge, with increased measuring precision and easier operation, permits easier access to all parts of the motor vehicle and can be operated in a simple manner with a number and type of measuring vehicles and measuring adaptors that have maximum suitability for each respective application.

The invention accomplishes the solution of the assigned problem with a single, bending-resistant measuring bar, adjustable below the motor vehicle to the latter's longitudinal direction, which is equipped along two opposite longitudinal sides with at least one each track, which serve as guides and mounting supports for measuring vehicles carrying measuring adaptors.

The measuring bridge of the invention is characterized by high torsion resistance, which in turn provides the basis for good measuring accuracy. The single measuring bar of the invention's measuring bridge requires only a minimum of space for the storage of the measuring bridge, as well as for its use below a motor vehicle which is to be measured and possibly straightened; besides, the single bar results in considerably less weight for the entire measuring bridge. On the one hand, this offers advantages in storing and transporting the measuring bridge; on the other hand, it results in free accessibility of the motor vehicle for connection to a straightening device and the actual straightening work. Furthermore, guiding the measuring vehicles on a single measuring bar, as in the invention's measuring bridge, permits any adjustment of the measuring vehicles along the measuring bar and their easy exchange for adaption to each respective measuring problem, as well as easy adjustment of the measuring bridge as a whole. Besides, the adjustment procedure for aligning the measuring bridge with the motor vehicle is very simple, just as the handling of the invention's measuring bridge in general requires only little power and labor, so that the bridge can be prepared for operation by a single man in a short time.

Advantageous designs and further developments of the invention are described in detail in the subclaims.

In this connection, special mention and emphasis must be made of the support of the entire measuring bridge on bearing rails, which are placed under it and work in conjunction with pneumatically or hydraulically adjustable bearing cylinders, which are attached to some measuring vehicles. This construction simplifies the displacement of the individual measuring vehicles relative to each other, since those measuring vehicles which are not supported on the bearing rails via bearing cylinders, can be attached to the measuring bar and moved with the latter as a unit; in addition, this construction offers a favorable method of adapting the position of the measuring bridge to the motor vehicle; here, the pressure end points on the motor vehicle can be located at maximum proximity to the pressure origin points at the measuring bridge.

Another important feature of the invention is the easy access to the adjusting elements at the various bearings for the rollers that are used to adjust the individual components relative to each other; this permits simple adjustment of these components and consequently increased measuring accuracy.

The drawing shows a preferred form of construction of the invention; the figures show the following.

Figure 1:
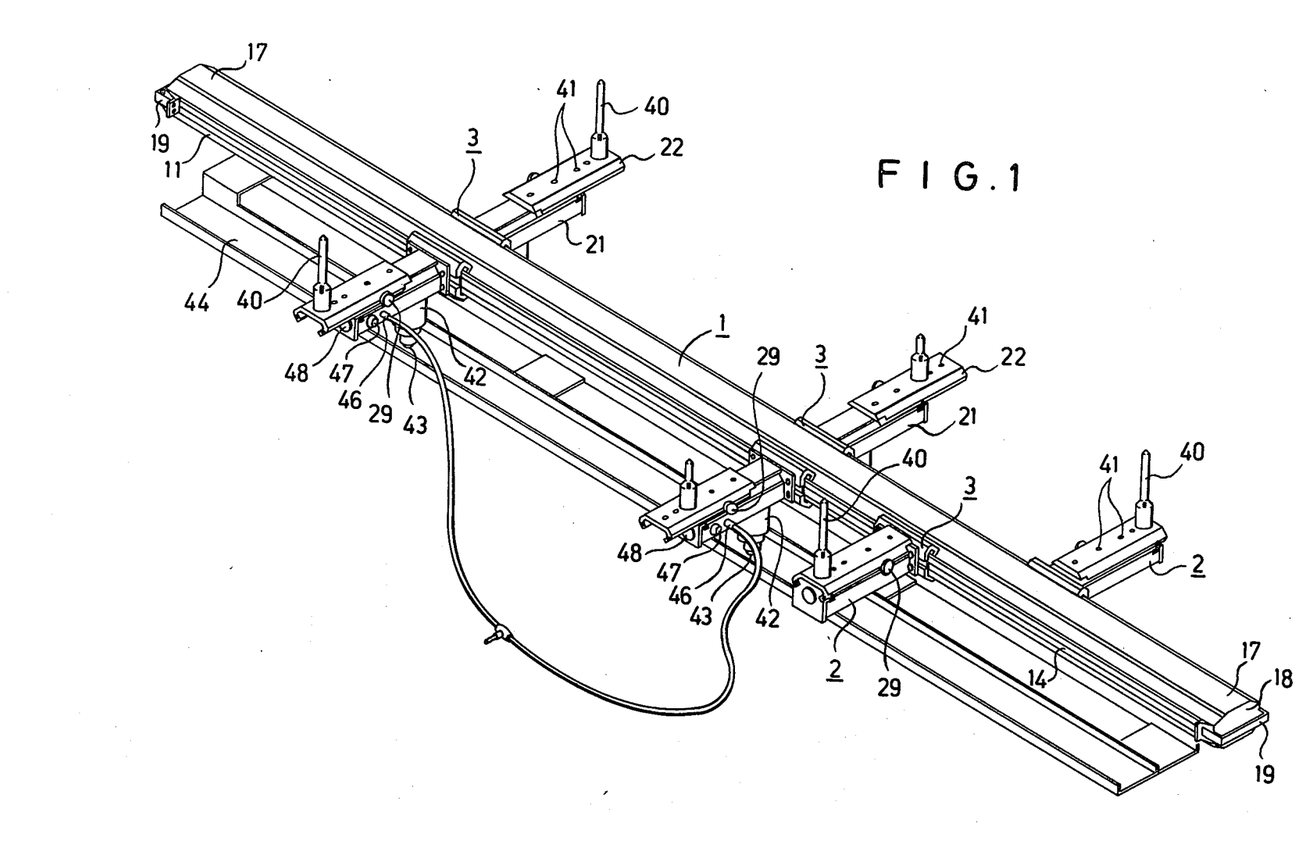
FIG. 1 a perspective total view of a measuring bridge according to the invention, FIG. 2 the measuring bar of the measuring bridge in FIG. 1 with support plates for measuring vehicles on both sides in a transverse section with a larger scale, FIG. 3 a measuring vehicle of the measuring bridge from FIG. 1 in a lateral view, with attached support plate, in a larger scale, FIG. 4 the measuring vehicle from FIG. 3 in a transverse section in a larger scale and FIG. 5 one end of the measuring bar of the measuring bridge from FIG. 1 in a transverse section (a), a lateral view (b) and an interior plan view (c).

The measuring bridge shown in FIG. 1 has as its main component a horizontally running measuring bar 1, on which a total of six measuring vehicles 2, each on a support plate 3, are movable in the longitudinal direction of the measuring bar; three measuring vehicles are located on one side of the bar, and three on the other side; each carries a vertical measuring adaptor 40. The bearing support for the measuring bridge in FIG. 1 is formed by a pair of horizontally running bearing rails 44, which support the movable measuring bridge; the bearing rails allow freedom of movement for the measuring bridge not only in its longitudinal direction, but in a limited fashion also transversely to it, so that the measuring bar 1 can be easily adjusted to the longitudinal direction of a motor vehicle to be measured.

Figure 2:
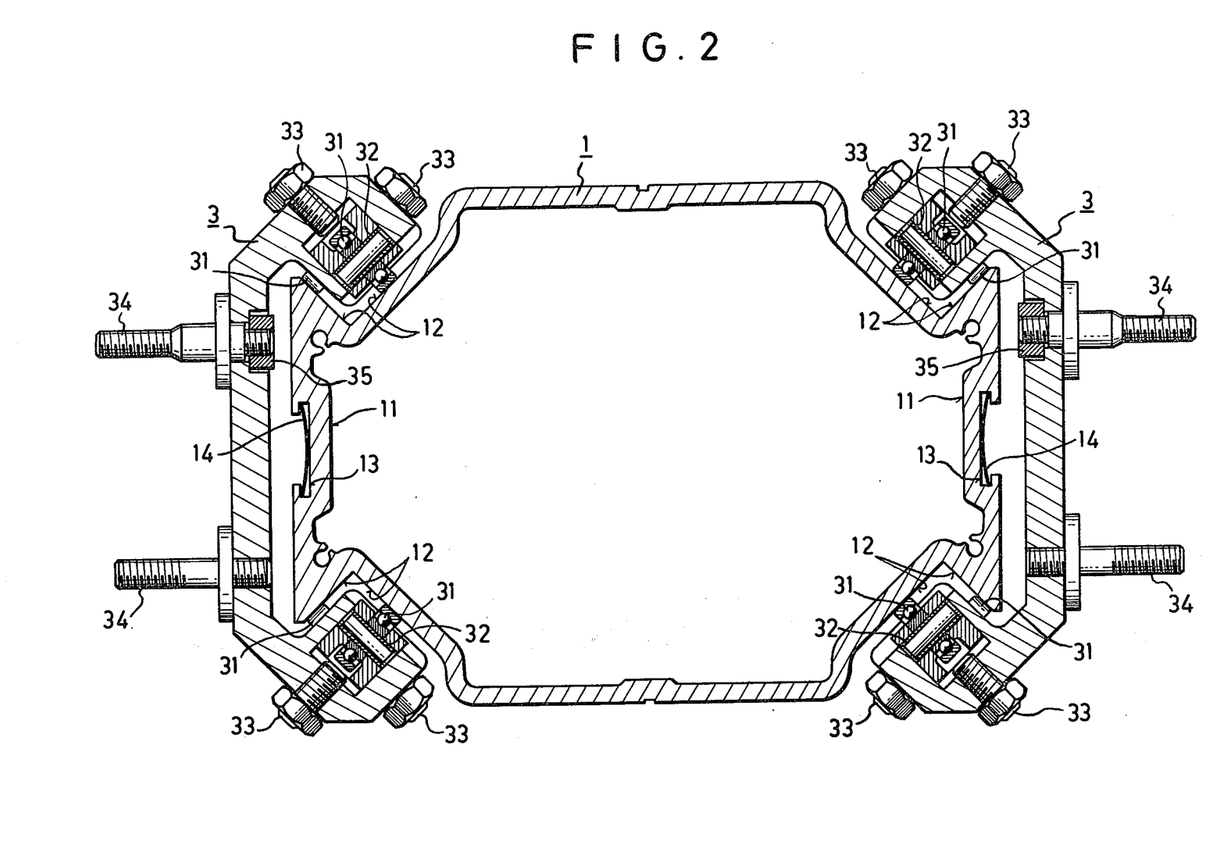
Figure 5A:
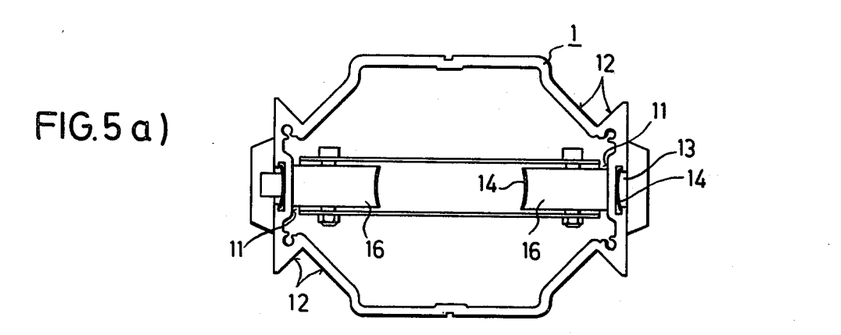
Figure 5B:
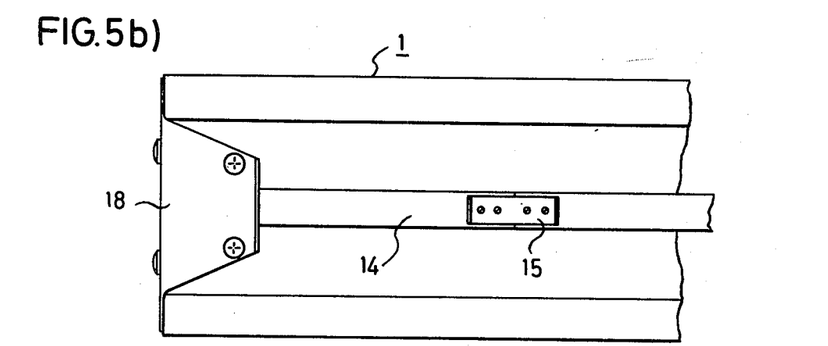
Figure 5C:
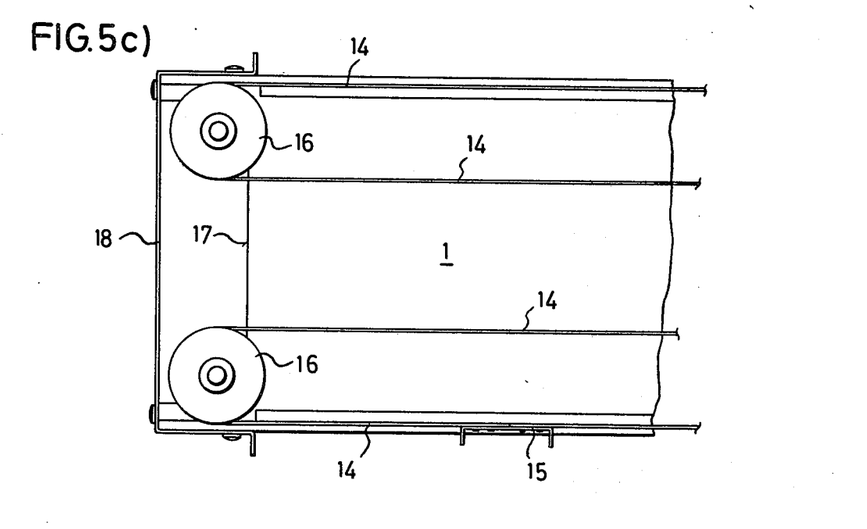

As can best be seen in FIG. 2, the measuring bar has a box-type profile. This profile essentially has the shape of a rectangle with the wide sides running horizontally and the narrow sides 11 running vertically; at their upper and lower outer edges, the narrow sides are pulled inward in such way that two each tracks 12 result, which together enclose a right angle and are inclined horizontally and vertically at an angle of ca. 45°; the outside contours of these tracks create the shape of an L at the four corners of the box-type profile. In addition, the narrow sides 11 of the measuring bar 1 have at their center one each groove 13, open to the outside, serving as the receptacle for a measuring tape 14, with which the position of the measuring vehicles 2 along the measuring bar 1 can be determined. By connecting both ends at a connecting point 15 (see FIG. 5), this tape 14 is continuous and runs at both ends 17 of the measuring bar 1 over guide rollers 16, as is also shown in FIG. 5. In this way the measuring tape 14 can be moved along the measuring bar 1 in such a manner that the zero point of its scale can be placed at a desired point along the measuring bar 1. To the outside, the box-type profile of the measuring bar 1 is closed off at its two ends 17 by a cover plate 18; besides, in order to facilitate the handling and transportation, the measuring bar 1 has one each handle 19 at both ends, as can best be seen in FIG. 1.

Figure 3:
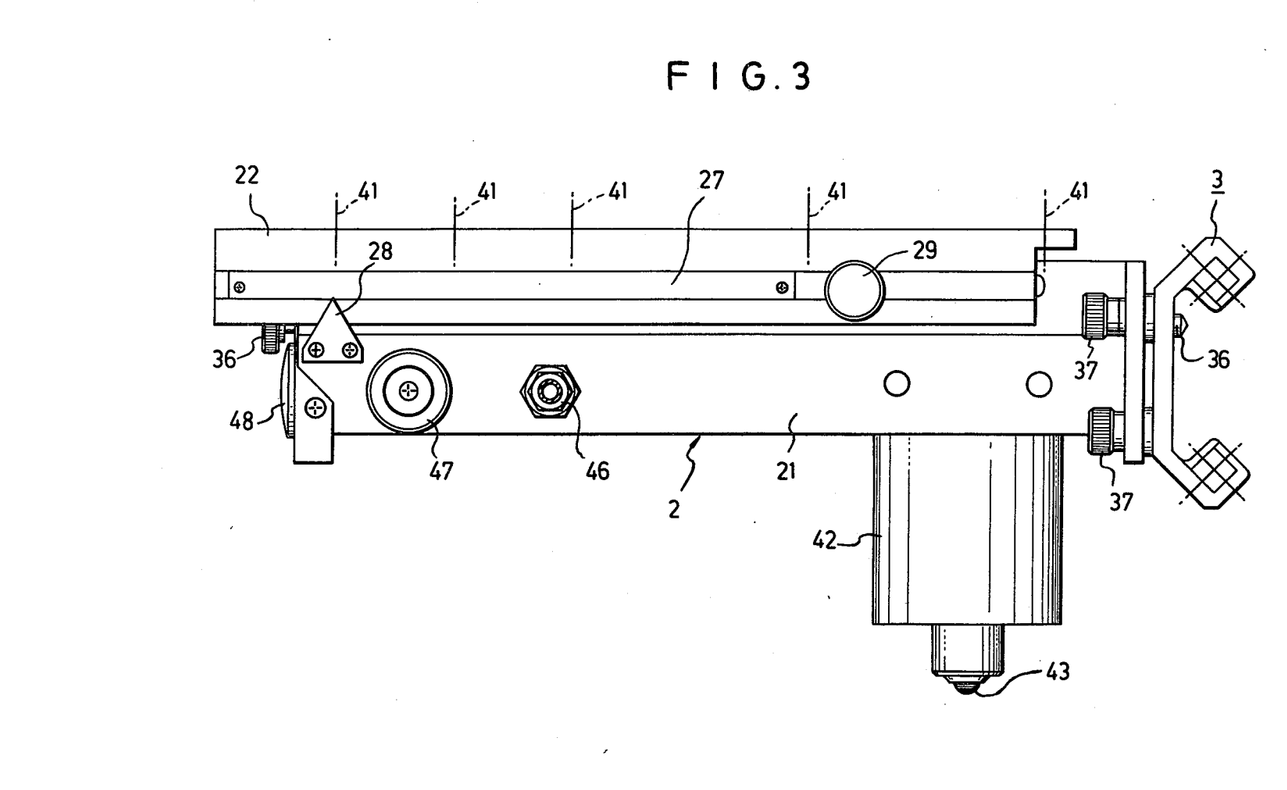

As again best seen in FIG. 2, the tracks 12 at the upper and lower edge of the narrow sides 11 of the measuring bar 1 serve as guides and, at the same time, mounting supports for the support plates 3, via which the measuring vehicles 2 are connected with the measuring bar 1. The profile of the support plates 3 has the shape of a C, whose open side faces the measuring bar 1, and which overlaps at its ends into a lower, respectively upper, track 12. The ends of the support plates 3 contain recesses for the mounting of bearings 32 for the rollers 31; the axles of the rollers run vertically to each other in such a way that the rollers 31 are arranged in pairs at the one and the other track 12 of an L at one of the corners of the box-type profile of the measuring bar 1, so that they can roll on these tracks 12 along the longitudinal direction of the measuring bar 1. To permit more exact adjustment of the rollers 31 with respect to their relative tracks 12, the bearings 32 for the rollers 31 have been provided with adjusting screws 33, which are accessible from the outside, so that the respective adjustments can be made easily. In the center of their C-profile the support plates 3 have, at their outer side facing away from the measuring bar 1, support bolts 34, which protrude horizontally to the outside; these support bolts 34 serve as mounting components for connecting a support plate 3 with its measuring vehicle 2. The upper support bolts 34 are designed to act together with a nut located at the inside of the C-profile of the respective support plate 3 to enable the exact adjustment of the supports bolts 34 - see FIG. 2. Each of the support bolts 34 has an outside thread at its free outer end, so that mounting nuts 37 can be screwed on the support bolts 34 as shown in FIG. 3, in order to create a detachable connection between the measuring vehicle 2 and its support plate 3. Thus connected detachably via the support plate 3 with the measuring bar 1, the measuring vehicle 2 can now be moved over the rollers 31 along the tracks 12 at the narrow sides 11 of the measuring bar 1 in the longitudinal direction of the measuring bar 1; a set screw 36, shown in FIG. 3, which runs longitudinally through the measuring vehicle 2 and also penetrates the appurtenant support plate 3, permits the locking of the measuring vehicle 2 and the appurtenant support plate 3 at any point along the measuring bar 1.

Figure 4:
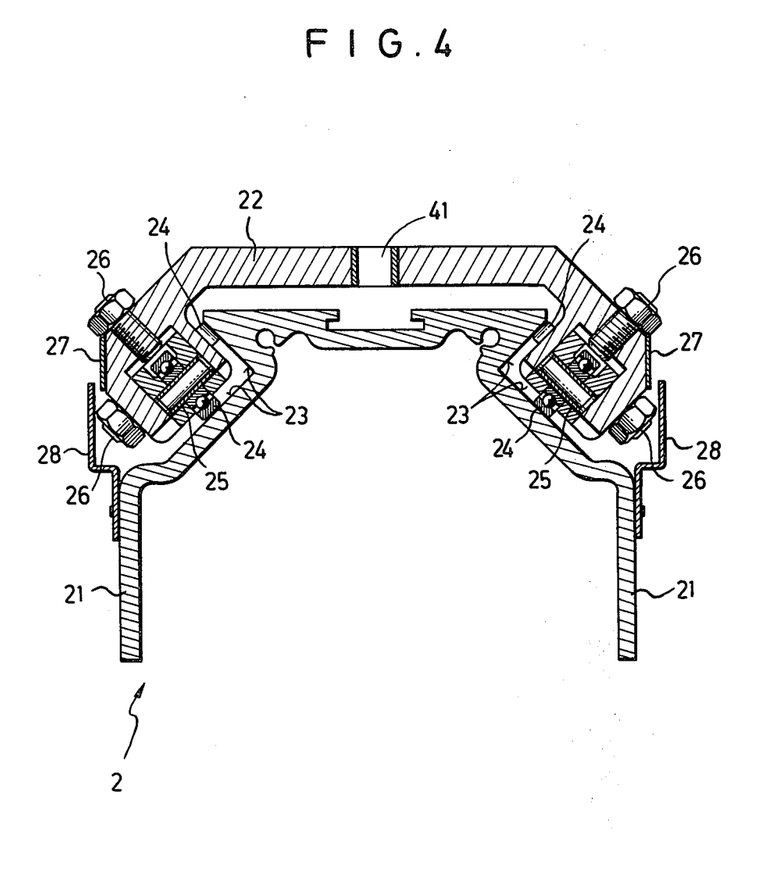

As can best be seen in FIGS. 3 and 4, each of the measuring vehicles 2 of the measuring bridge shown in FIG. 1 consists of a lower support 21 and an upper vehicle 22; this upper vehicle 22 can be moved in the longitudinal direction of the measuring vehicle 2 and thus traversely to the operating position of the measuring bar 1, relative to its support 21; this is shown in varying degrees for the individual measuring vehicles 2 in FIG. 1. The support 21, which has the shape of a U-profile facing downward, has in the area of its two upper outer edges two each tracks 23, which together form a right angle; these tracks 23 form at the outer face of the support 21, at each of the two upper outer edges of the support 21, the shape of an L, the shanks of which are inclined toward the horizontal and the vertical at an angle of ca. 45° (FIG. 4). These tracks 23 serve as guides and mounting supports for the upper vehicle 22, which is supported on the tracks 23 by means of rollers 24, whose axles run vertically to one another. The profile of the upper vehicle 22 has the shape of a C, whose open end faces and overlaps the support 21. At the ends of the upper vehicle 22, the rollers 24 are supported by bearings 25, which are equipped with adjusting screws 26 for exact adjustment of the rollers 24 of the upper vehicle 22 relative to the tracks 23 at the support 21. The adjusting screws are accessible from the outside, which very much facilitates the adjustment work. As a result of this design, the upper vehicle 22 can be moved with the rollers 24 along tracks 23 at support 21 in the longitudinal direction of the respective measuring vehicle 2, and thus transversely to the measuring bar 1. As seen in FIG. 3, a set screw 29 makes it possible to lock the upper vehicle 22 on the appurtenant support 21, with any longitudinal movement as desired. For measuring the respective longitudinal adjustment of the upper vehicle 22 relative to the support 21, measuring scales 27 are provided at both lateral edges of the upper vehicle 22. These scales act in conjunction with indicators 28, which are permanently attached to the support 21. Distributed along the entire length of the upper vehicle 22, and along its center axis, are a number of mounting supports 41 for the mounting of measuring adaptors 40; as shown in FIG. 4, these mounting supports are designed as plug-in bushings, into which is inserted a pin of appropriate size located at the lower end of the measuring adaptors 40. A measuring adaptor 40, plugged into an upper vehicle 22 in this manner, can be moved together with this upper vehicle 22 transversely to the measuring bar 1; together with the respective measuring vehicle 2 it can be adjusted in the longitudinal direction of the measuring bar 1 and located at a desired point. Since the measuring adaptors are also adjustable in their length, their ends can be used to mark the position of reference points on a motor vehicle, and to trace changes in the position of these reference points during the course of straightening work being done on this vehicle.

As is further shown in FIG. 1, bearing cylinders 42 are placed below some of the measuring vehicles 2 of the measuring bridge; these bearing cylinders 42 serve to support the respective measuring vehicles 2 and the measuring bar 1 connected to the measuring vehicles on the support rails 44. The bearing cylinders 42, as shown in FIG. 3, are attached to the supporting member 21 of the respective measuring vehicles by means of screws, and they each contain a piston which can move downward; a bearing roller 43 is located at the lower end of the piston. The entire measuring bridge as shown in FIG. 1 can be moved with the bearing rollers 43 at the various bearing cylinders 42 along the support rails 44 underneath. The downward movement of the pistons from the bearing cylinders 42 is achieved by pneumatic or hydraulic drive; the respective measuring vehicles 2 are equipped with connections 46 for pressure media lines 45, through which the respective pressure medium can fed to the bearing cylinders 42. At the connections of the individual bearing cylinders 42 with the pressure medium lines 45, pressure regulators 47 are inserted at the respective measuring vehicle 2; these pressure regulators 47 permit individual pressure regulation for each bearing cylinder 42. The effective pressure for each bearing cylinder 42 can be read on a manometer 48, which is located at the free front face of the respective measuring vehicle 2. By means of the bearing cylinders 42, the entire measuring bridge as shown in FIG. 1 can be placed from below, and with suitable pressure medium feed, against a motor vehicle to be measured (not shown in FIG. 1), after the measuring bar 1 has been equipped with a suitable selection of measuring adaptors 40 on the upper vehicles 22 of its measuring vehicles 2.

In practical application of the measuring bridge shown in FIG. 1, for example, the support rails 44 are first placed on the frame of a straightening device under the motor vehicle to be measured and possibly straightened. Then the measuring bar 1 is placed on the support rails 44 and likewise moved under the motor vehicle; during this step, the measuring bar 1 is rolling on the bearing rollers 43 of the bearing cylinders 42, which are attached to the measuring vehicles 2, which in turn are in a position which was determined relative to the measuring bar 1. Subsequently, suitably selected measuring adaptors 40 are plugged into plug-in bushings 41, which are located on the upper vehicles 22 of measuring vehicles 2 equipped with bearing cylinders 42. The measuring adaptors 40 are then adjusted to pre-determined reference points on undamaged portions of the motor vehicle. Pressure medium is then measured via the pressure regulators 47 into the bearing cylinders, which raises the measuring bar 1 and the attached measuring vehicles 2 in such a way that the selected measuring adaptors 40 are placed against the pre-determined reference points at the motor vehicle; thus, the measuring bar 1, and consequently the measuring bridge, is aligned with motor vehicle. When the measuring bridge is in this position, the measuring vehicles 2, which carry the measuring adaptors 40 assigned to the reference points on the motor vehicle, as well as the upper vehicles 22 of the measuring vehicles 2, are locked by tightening the respective set screws 36 and 29, while the set screws 36 and 29 on the other measuring vehicles 2 and their upper vehicles 22 are loosened, so that the latter can move freely in a longitudinal or transverse direction of the measuring bar 1. Additional suitable measuring adaptors 40 are then placed into receptacles 41 on the upper vehicles 22 and subsequently adjusted to additional reference points on other, possibly damaged, portions of the motor vehicle. By means of the measuring scales 14 and 27 on the measuring bar 1 and the upper vehicles 22, respectively, the actual spatial location of these motor vehicle reference points can then be determined and traced during straightening work being done on the motor vehicle; during this operation, the respective measuring adaptors 40 can be moved longitudinally and transversely to the measuring bar 1 and change their position, while the measuring bar 1 retains its set position relative to the motor vehicle.

I claim:

1. A measuring bridge for determining the orientation of reference points on a motor vehicle, said measuring bridge including:

a single bending-resistant measuring bar and a plurality of measuring vehicles, supporting means extending downwardly from said measuring bridge for supporting the same for movement relative to said motor vehicle so that said measuring bridge may be oriented, first and second track means located on said measuring bar and disposed respectively on the opposite sides thereof and extending longitudinally along said bar in general parallelism to each other, a plurality of said measuring vehicles being mounted respectively on each of said first and second track means, each measuring vehicle including support means movable longitudinally along its respective track means independently of the support means of the other measuring vehicles, one end of each measuring vehicle being coupled to its respective support means and the opposite end being spaced laterally from said track means, said measuring vehicles extending generally normally relative to its respective track means and outwardly from said measuring bar so that the area around the opposite ends of said measuring vehicles and between the measuring vehicles mounted on the same track means is unobstructed by track means to permit ready access to said motor vehicle, an additional track means being formed on each of said vehicles and extending generally perpendicularly to said first and second track means, and measuring means mounted on each of said additional track means for lateral movement relative to said measuring bar.

2. The measuring bridge set forth in claim 1 wherein each of said first and second track means includes first and second vertically spaced apart track portions, said support means including first and second vertically spaced apart roller means respectively engaging the first and second portions of its associated track for supporting said measuring vehicle on said track for longitudinal movement therealong.

3. The measuring bridge as set forth in claim 2 wherein the measuring bar is rectangular in cross-section, said first and second track portions each including a pair of tracks which are generally perpendicular to each other, each of said roller means including a pair of rollers engaging one of said tracks.

4. The measuring bridge set forth in claim 3 wherein said rectangular cross-section is arranged with horizontal and vertical sides, the horizontal sides being larger than said vertical sides.

5. The measuring bridge set forth in claims 1, 2 or 3 wherein said measuring bar has a pair of surfaces extending longitudinally therealong, a longitudinal groove formed in each of said surfaces, and a measuring tape disposed in each groove.

6. The measuring bridge set forth in claim 5 in which guide rollers are disposed at the end of the measuring bar, said measuring tape being continuous and extending over said guide rulers for adjustment along said measuring bar.

7. The measuring bridge set forth in claim 1 wherein each support means comprises a plate which is generally C-shaped in cross-section and whose open side faces the measuring bar.

8. The measuring bridge set forth in claim 7 wherein each of said track means includes first and second vertically-spaced apart track portions, the support plate including first and second sets of rollers each respectively engaging one of the track portions of its associated track.

9. The measuring bridge set forth in claim 8 wherein each support plate includes two sets of vertically spaced-apart rollers whose axis are disposed at right angles one to the other, said rollers respectively engaging the upper and lower track portions of its associated track.

10. The measuring bridge set forth in claim 9 wherein means are provided for adjusting said rollers in a direction parallel to their rotational axis and in a direction normal thereto.

11. The measuring bridge set forth in claim 1 wherein each measuring vehicle has a base portion coupled to the measuring bar and an upper portion mounted on said base portion for movement transverse to said measuring bar.

12. The measuring bridge set forth in claim 11 wherein each of said base portion includes tracks formed thereon and extending transversely to said measuring bar, said upper vehicle portion including rollers mounted on said base portion tracks and means supporting said rollers for adjustment in a direction parallel to their rotational axis and in a direction normal thereto.

13. The measuring bridge set forth in claim 12 wherein said upper vehicle portion is generally C-shaped in cross-sectioned with the open portion thereof facing said base portion.

14. The measuring bridge set forth in claim 13 wherein said measuring bar includes vertically spaced-apart tracks, each said measuring vehicle means including vertically spaced-apart rollers which respectively engage said tracks.

15. The measuring bridge set forth in claims 1, 2 or 3 wherein said supporting means comprises a plurality of vertically adjustable bearing cylinders each having roller means adjacent its lower end, one of said bearing cylinders being mounted on and extending downwardly from at least a pair of vehicles on one side of said bar and at least another vehicle on the other side of said bar, and track means disposed below said measuring bar for engagement by said roller means.

16. The measuring bridge set forth in claim 15 and including a pressure source coupled to all of said cylinders for simultaneous vertical adjustment of said measuring bar.

17. The measuring bridge set forth in claim 16 wherein said bearing cylinders are the sole support of said measuring bridge.

18. The measuring bridge set forth in claim 17 wherein each measuring vehicle has a base portion coupled to the measuring bar and an upper portion mounted on said base portion for movement transverse to said measuring bar, said bearing cylinders being mounted below and extending downwardly from base portions.

19. The measuring bridge set forth in claim 18 wherein each of said base portions include tracks formed thereon and extending transversely to said measuring bar, said upper vehicle portion including rollers mounted on said tracks and means supporting said rollers for adjustment in a direction parallel to their rotational axis and in a direction normal thereto.

20. The measuring bridge set forth in claim 12 wherein said upper vehicle portion is generally C-shaped and cross-sectioned with the open portion thereof facing said base portion.

21. A measuring bridge for determining the orientation of reference points on a motor vehicle, said measuring bridge including:
a single bending-resistant measuring bar adapted to be adjustably positioned below and oriented longitudinally relative to the vehicle,
first and second integral track means formed respectively on the opposite sides of said measuring bar and extending longitudinally along said bar in general parallelism to each other,
a plurality of measuring vehicles each including support means mounted respectively on each of said first and second track means,
one end of each measuring vehicle being coupled to its respective track means by said support means for longitudinal movement therealong and independently of the other measuring vehicles and the opposite end of each measuring vehicle being displaced laterally from said track means, said measuring vehicles extending generally normally relative to its respective track means and outwardly from said measuring bar, said track means and said support means comprising the sole supporting engagement of said vehicle and said track means so that the area around the opposite ends of said measuring vehicles and between measuring vehicles mounted on the same track means is unobstructed by track means to permit ready access to said motor vehicle,
an additional track means being formed on each of said measuring vehicles, and extending generally perpendicularly to said first and second track means, measuring means being mounted on each of said additional track means for lateral movement relative to said measuring bar, and vertically adjustable support means mounted on and extending downwardly from at least a pair of measuring vehicles on one side of said measuring bar and at least one measuring vehicle on the other side of said measuring bar for supporting said measuring bridge.

22. The measuring bridge set forth in claim 21 wherein each said vertically adjustable support means is pressure actuated, and a pressure source coupled to all of said support means for simultaneous vertical adjustment of said measuring bridge.

23. The measuring bridge set forth in claim 21 or 22 and including roller means at the lower end of each support means to permit horizontal movement of said measuring bridge.

* * * * *